United States Patent
Borisevich et al.

(10) Patent No.: US 10,423,334 B2
(45) Date of Patent: Sep. 24, 2019

(54) PREDETERMINED PLACEMENT FOR TAPE CARTRIDGES IN AN AUTOMATED DATA STORAGE LIBRARY

(71) Applicant: INTERNATIONAL BUSINESS MACHINES CORPORATION, Armonk, NY (US)

(72) Inventors: Illarion Borisevich, Tucson, AZ (US); Shawn M. Nave, Tucson, AZ (US); Khanh V. Ngo, Tucson, AZ (US); Timothy K. Pierce, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 247 days.

(21) Appl. No.: 15/397,059

(22) Filed: Jan. 3, 2017

(65) Prior Publication Data

US 2018/0188955 A1 Jul. 5, 2018

(51) Int. Cl.
*G11B 15/68* (2006.01)
*G06F 3/06* (2006.01)
*G11B 17/22* (2006.01)

(52) U.S. Cl.
CPC .......... *G06F 3/061* (2013.01); *G06F 3/0611* (2013.01); *G06F 3/0658* (2013.01); *G06F 3/0686* (2013.01); *G11B 15/689* (2013.01); *G11B 15/6835* (2013.01); *G11B 17/22* (2013.01); *G11B 17/228* (2013.01)

(58) Field of Classification Search
CPC .. G11B 15/689; G11B 15/6835; G11B 17/228
USPC .............................................. 360/92.1, 98.05
See application file for complete search history.

(56) References Cited

U.S. PATENT DOCUMENTS

| 5,239,650 | A | * | 8/1993 | Hartung | G06F 3/0601 |
| | | | | | 710/8 |
| 5,784,646 | A | * | 7/1998 | Sawada | G06F 12/08 |
| | | | | | 707/999.202 |
| 5,933,853 | A | * | 8/1999 | Takagi | G06F 12/08 |
| | | | | | 711/113 |
| 7,672,753 | B1 | | 3/2010 | Rossi | |
| 7,788,413 | B1 | | 8/2010 | Justiss et al. | |
| 9,183,875 | B2 | | 11/2015 | Ries et al. | |

(Continued)

FOREIGN PATENT DOCUMENTS

WO 9301595 A1 1/1993

OTHER PUBLICATIONS

"Apparatus, System,and Method for Optimally Positioning an Idle Robotic Accessor in a Tape Library," http://www.technology-x.net/G06F3/201410213770.html (25 pages).

Primary Examiner — Jefferson A Evans
(74) Attorney, Agent, or Firm — Griffiths & Seaton PLLC

(57) ABSTRACT

Embodiments for predetermining optimal demount position for demounting data storage cartridges in an automated data storage library by a processor. A selected demount position may be predetermined, while performing one of a plurality of robotic movements by an accessor, for each mounted data storage cartridge for demounting data storage cartridges in the automated data storage library such that each predetermined selected demount position is stored in a lookup table of predetermined selected demount positions for a subsequent demount operation. The idle time of the accessor during a demount operation may be reduced.

18 Claims, 8 Drawing Sheets

(56) References Cited

U.S. PATENT DOCUMENTS

| | | |
|---|---|---|
| 2002/0087880 A1 | 7/2002 | Rhoades |
| 2005/0083795 A1* | 4/2005 | Doi ..................... G11B 17/228 |
| | | 369/30.27 |
| 2005/0197736 A1* | 9/2005 | Hanagata ........... G11B 15/6835 |
| | | 700/214 |
| 2008/0114936 A1 | 5/2008 | Desai |
| 2010/0114361 A1 | 5/2010 | Starr et al. |
| 2010/0142071 A1 | 6/2010 | Wideman |
| 2015/0050106 A1* | 2/2015 | Thompson ......... G11B 15/6835 |
| | | 414/273 |
| 2015/0194183 A1* | 7/2015 | Sato .................... G11B 15/689 |
| | | 700/214 |
| 2015/0231783 A1 | 8/2015 | Miller et al. |
| 2018/0143215 A1* | 5/2018 | Chang .............. G01N 35/00732 |

* cited by examiner

PREDETERMINED PLACEMENT FOR TAPE CARTRIDGES IN AN AUTOMATED DATA STORAGE LIBRARY

BACKGROUND OF THE INVENTION

Field of the Invention

The present invention relates in general to computing systems, and more particularly to, various embodiments for predetermining optimal demount position in an automated data storage library using a computing processor.

Description of the Related Art

Data storage libraries provide a means of storing large amounts of data for host computer systems. Automated data storage libraries are known for providing cost effective storage and retrieval of large quantities of data, typically from data storage cartridges stored in storage slots of the library. The libraries may comprise large numbers of data storage media that are stored in storage shelves, large numbers of data storage drives to read and write data with respect to the data storage media, one or more robot accessors to access the data storage media to move the data storage media between the storage shelves and data storage drives, and control units to control the operation of the library and control the flow of data and information between the library and host computer systems. The data storage cartridges are typically extracted from the storage slots or drives, placed in the storage slots or drives, and transported within the library by one or more robotic accessors.

SUMMARY OF THE INVENTION

Various embodiments for predetermining optimal demount position in an automated data storage library by a processor are provided. In one embodiment, by way of example only, a method for predetermining optimal demount position for demounting data storage cartridges in an automated data storage library, again by a processor, is provided. A selected demount position may be predetermined, while performing one of a plurality of robotic movements by an accessor, for each mounted data storage cartridge for demounting data storage cartridges in the automated data storage library such that each predetermined selected demount position is stored in a lookup table of predetermined selected demount positions for a subsequent demount operation. The idle time of the accessor during a demount operation may be reduced.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
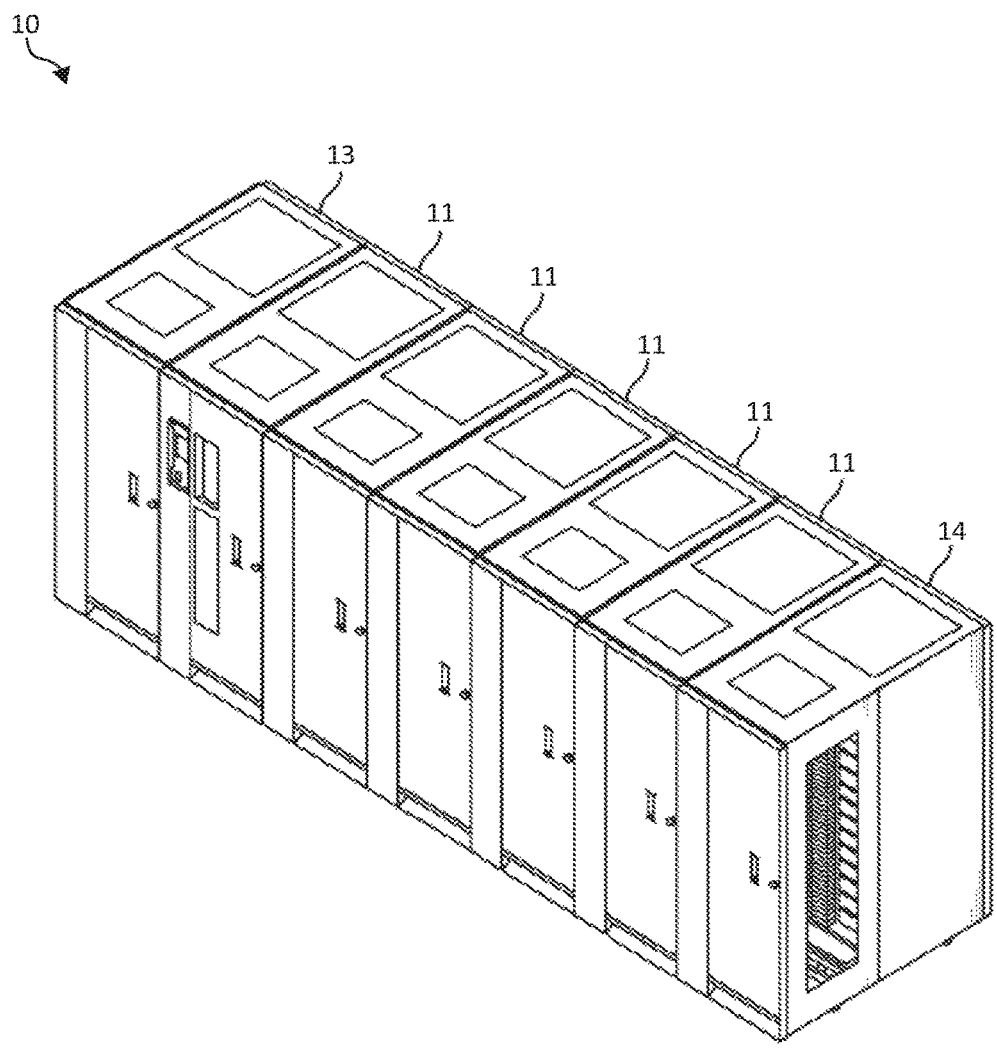
FIG. 1 is an isometric view of an automated data storage library in accordance with an embodiment of the present invention.

As previously stated, automated data storage libraries provide a means for storing large quantities of data on data storage media that are not permanently mounted in data storage drives, and that are stored in a readily available form on storage shelves or slots. One or more robotic accessors retrieve selected data storage media from storage shelves and provide them to data storage drives. Typically, data stored on data storage media of an automated data storage library, once requested, is needed quickly. The data in automated data storage libraries may be stored on media of data storage cartridges that are, in turn, stored at storage slots or the like inside the library in a fashion that renders the media, and its resident data, accessible for physical retrieval. Such data storage cartridges are commonly termed "removable media." Data storage cartridge media may comprise any type of media on which data may be stored and which may serve as removable media, including but not limited to magnetic media (such as magnetic tape or disks), optical media (such as optical tape or disks), electronic media, or other suitable media. An example of a data storage cartridge that is widely employed in automated data storage libraries for mass data storage is a magnetic tape cartridge.

In addition to data storage media, automated data storage libraries may comprise data storage drives that write data to, and/or read data from, the data storage cartridge media. Further, the automated data storage library may comprise input/output (I/O) stations at which data storage cartridges are supplied or added to, or removed from, the library. The transport of data storage cartridges between data storage slots, data storage drives, and I/O stations may be accomplished by one or more robotic accessors. Such accessors may have grippers for physically retrieving the selected data storage cartridges from the data storage slots within the automated data storage library and transporting such cartridges to the data storage drives by moving, for example, in a horizontal "X" and vertical "Y" direction.

In automated tape libraries, mount performance is a metric for comparing different tape libraries. Mount performance may be defined as the time required to mount a data storage cartridge into a tape drive and subsequently unload the data storage cartridge from the tape drive through the automated data storage library robotics. A total mount performance may be reported as a number of mounts per hour. In one aspect, in large enterprise class libraries, especially libraries using deep slot technology, each time a data storage cartridge is unloaded from a tape drive a calculation may be performed to determine a destination slot using one or more mathematical or calculation operations, algorithms, or database queries. In one aspect, a calculation operation may be performed using various mathematical operations or functions that may involve one or more mathematical operations (e.g., using addition, subtraction, division, multiplication, standard deviations, means, averages, percentages, statistical modeling using statistical distributions, by finding minimums, maximums or similar thresholds for combined variables, etc.). In a larger automated data storage library system such as, for example, an 18 frame tape library, an inventory table can be extremely large requiring an increase in time for determining an optimal destination slot, which delays the demount of that tape cartridge and in turn causes any incoming mounts to take additional time on the job/performance queue.

In one aspect of the present invention, when the automated data storage library performs the demounts of cartridges being removed from tape drives, the tape drive status may be checked to determine whether or not a tape cartridge can be accessed. Using an inventory table for the automated data storage library, an available demount position for the tape cartridge may be determined based on various algorithms for optimal cartridge placement. The tape cartridge may then be moved or located to the demount position. The next time the library has to perform a demount, the library may go through the same process and recalculate the data to find the optimal demount storage slot. However, the mechanisms of the embodiments optimize this process and reduce the recalculation and inefficiency of the automated data storage library by performing the calculation or determination of an optimal demount position during the robotic movements. The automated data storage library increases the robotic mount performance by predetermining the optimal demount position during the robotic movements of the previous cartridge move for demounting data storage cartridges in an automated data storage library.

A selected demount position may be predetermined, while performing one of a plurality of robotic movements by an accessor, for each mounted data storage cartridge for demounting data storage cartridges in the automated data storage library such that each predetermined selected demount position is stored in a lookup table of predetermined selected demount positions for a subsequent demount operation. In this way, the optimal demount position is predetermined during the robotic movements as opposed to performing the calculation or determination after the demount command has been issued. In one aspect, the optimal demount position is the shortest path from source location to a destination location or may be defined as the optimal destination from a demounting drive during accessor movement to dwindle or reduce robot idle time during a demount operation. That is, the present invention predetermines each of the tape positions for each mounted data storage cartridge, which eliminates robot idle time during demounts. The present invention predetermining includes calculating the best placement of demounted cartridges from a tape drive back into storage slots, as well as removing idle robot time during demounts. The calculation operation may include one or more various mathematical operations (e.g., using addition, subtraction, division, multiplication, standard deviations, means, averages, statistical modeling using statistical distributions, etc.) and undergo various data analytics functions.

By performing the calculation or determination of the selected, predetermined demount position during the robotic movements, the library increases efficiency and reduces the time to move or relocate a tape cartridge, and increases the mounts per hour in the library by predetermining demount position during the robotic movements. In one aspect, the optimal position (e.g., the selected, predetermined demount position) may be based, at least in part, on one or more of physical locations, history of accesses, time of last accesses, a minimized average time to retrieve an arbitrary media item given an arbitrary distribution of the media, or combination thereof. In an additional aspect, the optimal position may also be based, at least in part, on placing a data storage cartridge in a foremost tier (e.g., a "front most tier") in the library where the data storage cartridges are arranged in sequential order of tiers from front to rear.

It should be noted that the present invention has application to any suitable storage subsystem with an automated storage media and retrieval library for storing and accessing storage media located within the subsystem. Further, storage media may be magnetic storage media such as magnetic tape and magnetic disk, optical storage media such as compact disk (CD) and digital versatile disk (DVD), electronic storage media such as swappable flash electrically programmable read only memory (flash EPROM, CompactFlash, secure digital ("SD"), micro SD, etc.) or any suitable equivalent non-volatile removable storage media.

Figure 2:
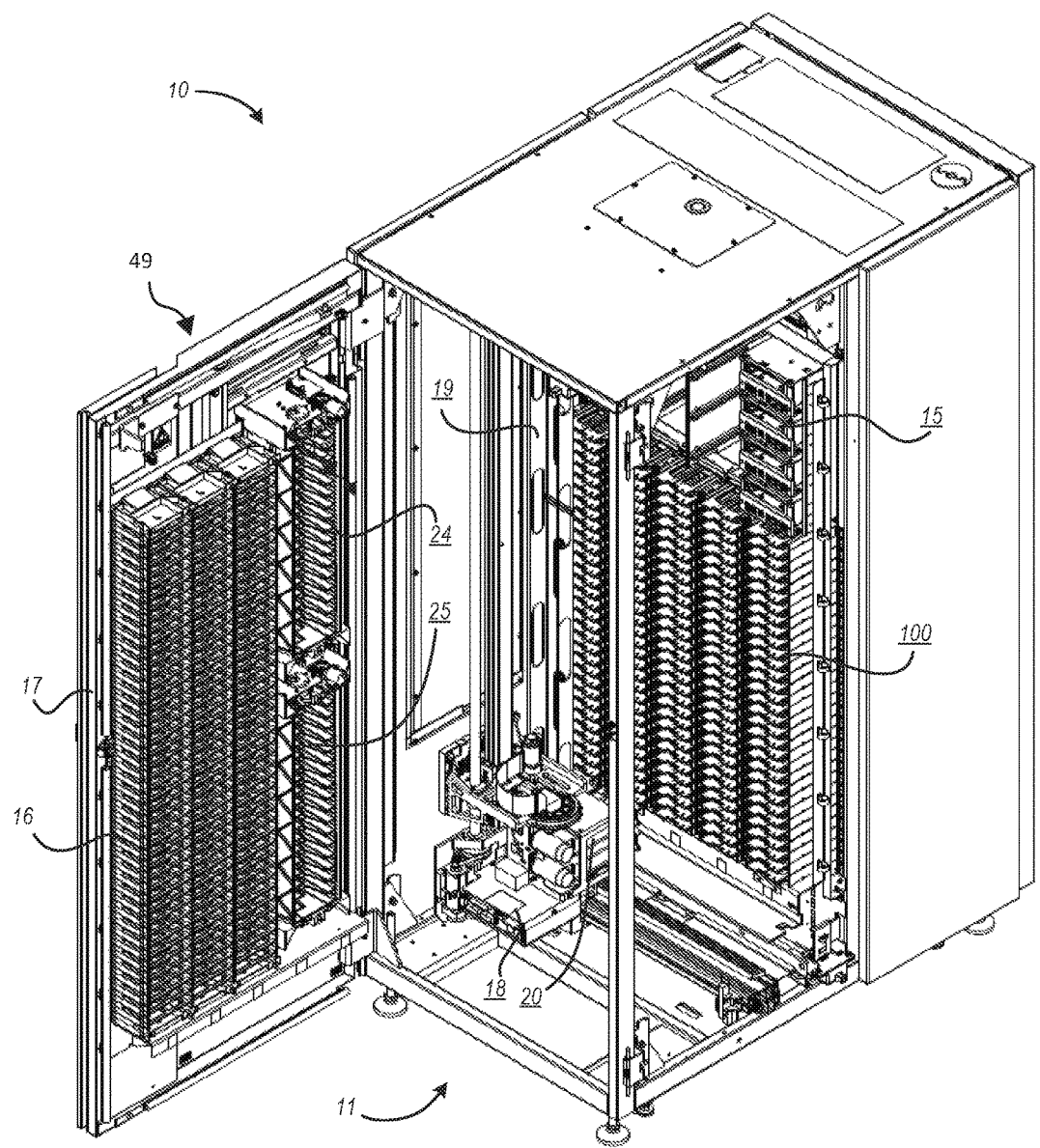
FIG. 2 is an isometric view of a frame of the automated data storage library of FIG. 1, with the view specifically depicting an exemplary basic configuration of the internal components of a library.

Turning now to FIGS. 1 and 2, an automated data storage library 10 which stores and retrieves data storage cartridges containing data storage media (not shown) at multi-cartridge deep slot cells 100 and single cartridge storage slots 16. It is noted that references to "data storage media" herein refer to the recording media of data storage cartridges, and for purposes herein the two terms may also be used synonymously. The library of FIG. 1 comprises a left hand service bay 13, one or more storage frames 11, and right hand service bay 14. As will be discussed, a frame may comprise an expansion component of the library. Frames may be added or removed to expand or reduce the size and/or functionality of the library. Frames may comprise additional storage slots, deep slot cells, drives, import/export stations, accessors, operator panels, etc.

FIG. 2 shows an example of a storage frame 11, which is the base frame of the library 10 and is contemplated to be the minimum configuration of the library. In this minimum configuration, there is only a single robotic accessor (i.e., there are no redundant accessors) and there is no service bay. The library 10 is arranged for accessing data storage media in response to commands from at least one external host system (not shown), and comprises a plurality of storage slots 16 on front wall 17 and a plurality of multi-cartridge deep slot cells 100 on rear wall 19, both for storing data storage cartridges that contain data storage media. The library 10 may also include one or more doors 49 (e.g., a front door, a side door, and/or a back door). That is, the library 10 access door 49 may comprise a door, hatch, cover, panel, magazine, or any other structure or assembly that may provide access to any internal portion of the library 10 that is not normally accessible.

The storage slots 16 are configured to store a single data storage cartridge, and the multi-cartridge deep slot cells 100 are configured to store a plurality of data storage cartridges arranged in sequential order of tiers from front to rear. The library also comprises at least one data storage drive 15 for reading and/or writing data with respect to the data storage media; and a first accessor 18 for transporting the data storage cartridges between the plurality of storage slots 16, the multi-cartridge deep slot cells 100, and the data storage drive(s) 15. The data storage drives 15 may be optical disk drives or magnetic tape drives, or other types of data storage drives as are used to read and/or write data with respect to the data storage media. The storage frame 11 may optionally comprise an operator panel or other user interface, such as a web-based interface, which allows a user to interact with the library. The storage frame 11 may optionally comprise an upper I/O station 24 and/or a lower I/O station 25, which allows data storage cartridges to be added to the library inventory and/or removed from the library without disrupting library operation. Herein, adding data storage cartridges to the library may also be called "inserting" or "importing" data storage cartridges. Herein, removing data storage cartridges from the library may also be called "ejecting" or "exporting" data storage cartridges. Also herein, slots of the multi-cartridge deep slot cells 100, the single cartridge storage slots 16, the cartridge slot of drive(s) 15, and the slots of I/O station 24, 25 may all be referred to as storage slots. Thus, any location at which a data storage cartridge may reside within the library 10 may be referred to as a storage slot. The library 10 may comprise one or more storage frames 11, each having storage slots 16 and/or multi-cartridge deep slot cells 100 accessible by first robotic accessor 18.

As described above, the storage frames 11 may be configured with different components depending upon the intended function. One configuration of storage frame 11 may comprise storage slots 16 and/or multi-cartridge deep slot cells 100, data storage drive(s) 15, and other optional components to store and retrieve data from the data storage cartridges, and another storage frame 11 may comprise storage slots 16 and/or multi-cartridge deep slot cells 100 and no other components.

The first accessor 18 comprises a gripper assembly 20 for gripping one or more data storage cartridges. The gripper assembly may include one or more devices, mounted on or near the gripper 20, to "read" identifying information about the data storage cartridge and to locate fiducial marks for calibrating the library. In one aspect, the device may be a camera scanner.

Figure 3:
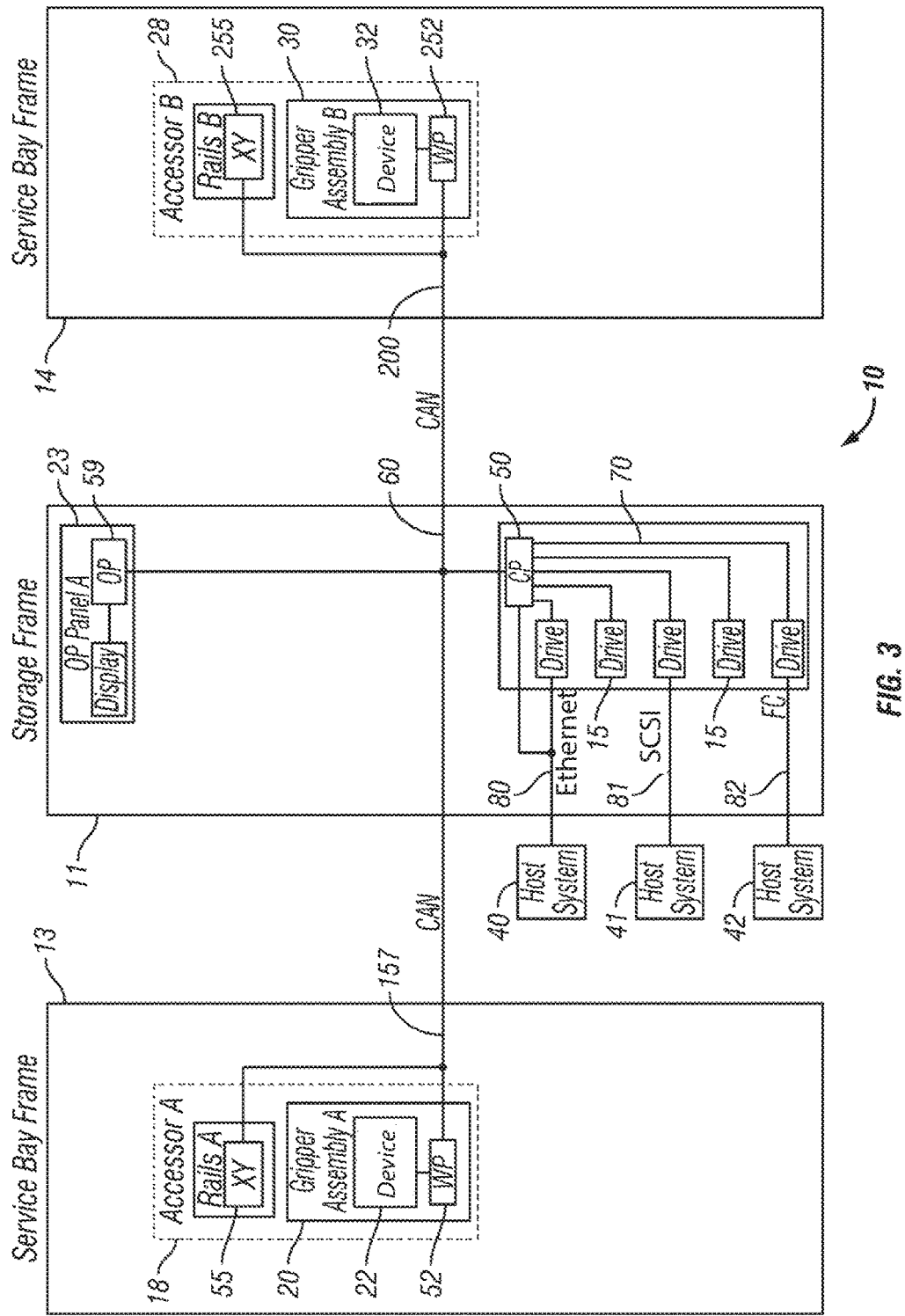
FIG. 3 is a diagram of the automated data storage library of FIGS. 1 and 2, depicting a library that employs a distributed system of modules with a plurality of processor nodes.

FIG. 3 illustrates an embodiment of an automated data storage library 10 of FIGS. 1 and 2, which employs a controller arranged as a distributed system of modules with a plurality of processor nodes. While the automated data storage library 10 is illustrated as employing a distributed control system, the present invention may be implemented in automated data storage libraries regardless of control configuration, such as, but not limited to, an automated data storage library having one or more library controllers that are not distributed.

The library of FIG. 3 comprises one or more storage frames 11, a left hand service bay 13 and a right hand service bay 14. The left hand service bay 13 is shown with a first accessor 18. As discussed above, the first accessor 18 comprises a gripper assembly 20 and may include one or more devices 22 to "read" identifying information about the data storage cartridges and to locate and calibrate fiducial marks. The right hand service bay 14 is shown with a second robotic accessor 28. The second accessor 28 comprises a gripper assembly 30 and may include one or more devices 32 to "read" identifying information about the data storage cartridges and to locate fiducial marks. In the event of a failure or other unavailability of the first accessor 18, or its gripper 20, etc., the second accessor 28 may perform some or all of the functions of the first accessor 18. The two accessors 18, 28 may share one or more mechanical paths or they may comprise completely independent mechanical paths. In one example, the accessors 18, 28 may have a common horizontal rail with independent vertical rails. The first accessor 18 and the second accessor 28 are described as first and second for descriptive purposes only and this description is not meant to limit either accessor to an association with either the left hand service bay 13, or the right hand service bay 14.

In the exemplary library, first accessor 18 and second accessor 28 move their grippers in at least two directions, called the horizontal "X" direction and vertical "Y" direction, to retrieve and grip, or to deliver and release the data storage cartridge at the storage slots 16 and multi-cartridge deep slot cells 100, or input/output stations 24, 25, and to mount and demount the data storage cartridge at the data storage drives 15.

The exemplary library 10 receives commands from one or more host systems 40, 41 or 42. The host systems, such as host servers, communicate with the library directly, e.g., on path 80, through one or more control ports (not shown), or through one or more data storage drives 15 on paths 81, 82, providing commands to access particular data storage cartridges and move the cartridges, for example, between the storage slots 16 and the data storage drives 15. The commands are typically logical commands identifying the cartridges or cartridge media and/or logical locations for accessing the media. The terms "commands" and "work requests" are used interchangeably herein to refer to such communications from the host system 40, 41 or 42 to the library 10 as are intended to result in accessing particular data storage media within the library 10.

The exemplary library is controlled by a library controller, which in one embodiment comprises a distributed control system receiving the logical commands from hosts, determining the required actions, and converting the actions to physical movements of and actions by first accessor 18 and/or second accessor 28.

In the exemplary library, the distributed control system comprises a plurality of processor nodes, each having one or more computer processors. In one example of a distributed control system, a communication processor node 50 may be located in a storage frame 11. The communication processor node provides a communication link for receiving the host commands, either directly or through the drives 15, via at least one external interface, e.g., coupled to line 80.

The communication processor node 50 may additionally provide a communication link 70 for communicating with the data storage drives 15. The communication processor node 50 may be located in the frame 11, close to the data storage drives 15. Additionally, in an example of a distributed processor system, one or more additional work processor nodes are provided, which may comprise, e.g., a work processor node 52 that may be located at first accessor 18, and that is coupled to the communication processor node 50 via a network 60, 157. Each work processor node may respond to received commands that are broadcast to the work processor nodes from any communication processor node, and the work processor nodes may also direct the operation of the accessors, providing move commands. An XY processor node 55 may be provided and may be located at an XY system of first accessor 18. The XY processor node 55 is coupled to the network 60, 157, and is responsive to the move commands, operating the XY system to position the gripper 20.

Also, an operator panel processor node 59 may be provided at the optional operator panel 23 for providing an interface for communicating between the operator panel and the communication processor node 50, the work processor nodes 52, 252, and/or the XY processor nodes 55, 255.

A network, for example comprising a common bus 60, is provided, coupling the various processor nodes. The network may comprise a robust wiring network, such as the commercially available CAN (Controller Area Network) bus system, which is a multi-drop network, having a standard access protocol and wiring standards. Other networks, such as Ethernet, or a wireless network system, such as RF or infrared, may be employed in the library as is known to those of skill in the art. In addition, multiple independent networks may also be used to couple the various processor nodes.

The communication processor node 50 is coupled to each of the data storage drives 15 of a storage frame 11, via lines 70, communicating with the drives and with host systems 40, 41 and 42. Alternatively, the host systems may be directly coupled to the communication processor node 50, at input 80 for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, host connections 80 is an Ethernet network, 81 may be an SCSI (Small Computer Systems Interface) bus, and bus 82 comprises an example of a Fibre Channel bus which is a high speed serial data interface.

The data storage drives 15 may be in close proximity to the communication processor node 50, and may employ a short distance communication scheme, such as SCSI, or a serial connection, such as RS-422. The data storage drives 15 are thus individually coupled to the communication processor node 50 by means of lines 70. Alternatively, the data storage drives 15 may be coupled to the communication processor node 50 through one or more networks, such as a common bus network or Ethernet.

Additional storage frames 11 may be provided and each is coupled to the adjacent storage frame. Any of the storage frames 11 may comprise communication processor nodes 50, storage slots 16, multi-cartridge storage cells 100, data storage drives 15, and networks 60. Further, as described above, the automated data storage library 10 may comprise a plurality of accessors. A second accessor 28, for example, is shown in a right hand service bay 14 of FIG. 3. The second accessor 28 may comprise a gripper 30 for accessing the data storage cartridges, and an XY system 255 for moving the second accessor 28. The second accessor 28 may run on the same horizontal mechanical path as first accessor 18, or on an adjacent path. The exemplary control system additionally comprises an extension network 200 forming a network coupled to network 60 of the storage frame(s) 11 and to the network 157 of left hand service bay 13. Alternatively, one or more of the processor nodes (XY 55, WP 52, CP 50, OP 59, XY 255, and WP 252) may comprise dual networks (not shown) to allow independent redundant communication between the processor nodes and/or the accessors 18, 28.

In FIG. 3 and the accompanying description, the first and second accessors are associated with the left hand service bay 13 and the right hand service bay 14 respectively. This is for illustrative purposes and there may not be an actual association. In addition, network 157 may not be associated with the left hand service bay 13 and network 200 may not be associated with the right hand service bay 14. Depending on the design of the library, it may not be necessary to have a left hand service bay 13 and/or a right hand service bay 14.

An automated data storage library 10 may comprise one or more controllers to direct the operation of the automated data storage library. Host computers and data storage drives typically comprise similar controllers. A library controller may take many different forms and may comprise, for example but not limited to, an embedded system, a distributed control system, a personal computer, or a workstation. Essentially, the term "library controller" as used herein is intended in its broadest sense as a device that contains at least one computer processor, as such term is defined herein.

Figure 4:
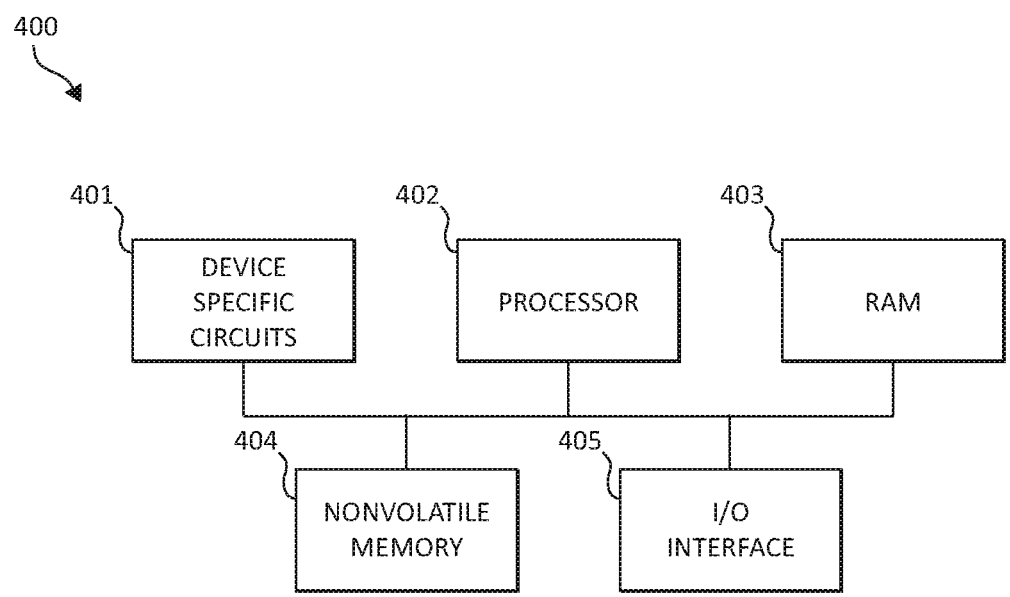
FIG. 4 is a block diagram depicting an exemplary controller configuration.

FIG. 4 shows a typical controller 400 with a processor 402, RAM (Random Access Memory) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, FPGA (Field Programmable Gate Array), ASIC (Application Specific Integrated Circuit), discrete logic, or the like. The RAM (Random Access Memory) 403 may be used to hold variable data, stack data, executable instructions, and the like. The nonvolatile memory 404 may comprise any type of nonvolatile memory such as, but not limited to, EEPROM (Electrically Erasable Programmable Read Only Memory), flash PROM (Programmable Read Only Memory), battery backup RAM, CompactFlash (CF), Secure Digital (SD), micro-SD, and hard disk drives. The nonvolatile memory 404 may be used to hold the executable firmware and any nonvolatile data. The I/O interface 405 comprises a communication interface that allows the processor 402 to communicate with devices external to the controller. Examples may comprise, but are not limited to, serial interfaces (e.g., RS-232 or RS-422), USB (Universal Serial Bus), Ethernet, or SCSI. The device specific circuits 401 provide additional hardware to enable the controller 400 to perform unique functions such as, but not limited to, motor control of a cartridge gripper. The device specific circuits 401 may comprise electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the present invention may be implemented in various automated data storage libraries regardless of control configuration, such as, but not limited to, an automated data storage library having one or more library controllers that are not distributed. A library controller may comprise one or more dedicated controllers of a prior art library. For example, there may be a primary controller and a backup controller. In addition, a library controller may comprise one or more processor nodes of a distributed control system. For example, communication processor node 50 (FIG. 3) may comprise the library controller while the other processor nodes (if present) may assist the library controller and/or may provide backup or redundant functionality. In another example, communication processor node 50 and work processor node 52 may work cooperatively to comprise the library controller while the other processor nodes (if present) may assist the library controller and/or may provide backup or redundant functionality. Still further, all of the processor nodes may comprise the library controller. Herein, the library controller may comprise a single processor or controller or it may comprise multiple processors or controllers.

Figure 5A:
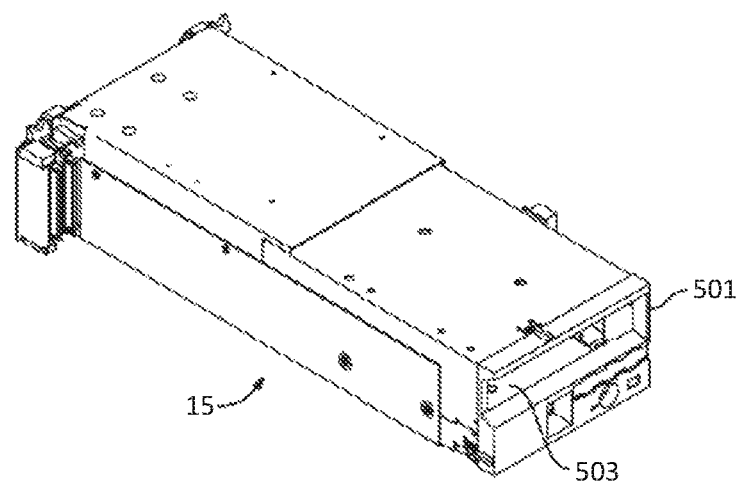
FIGS. 5A and 5B are isometric views of the front and rear of a data storage drive of the automated data storage library of FIGS. 1, 2 and 3.
Figure 5B:
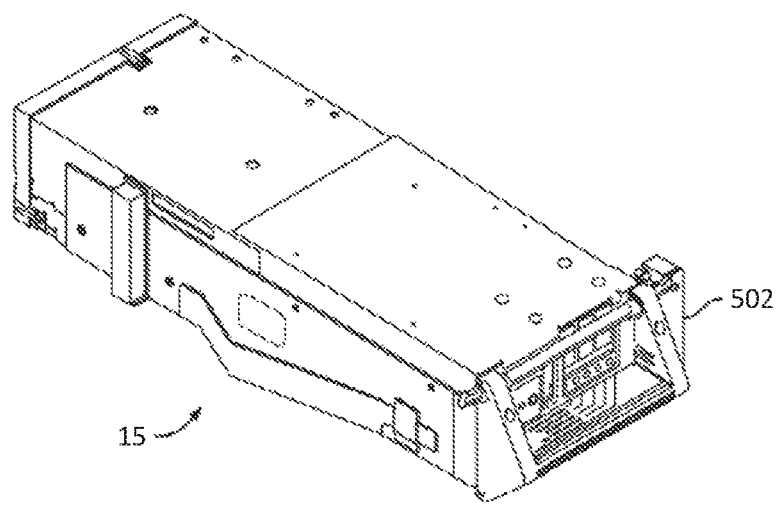

FIGS. 5A and 5B illustrate an embodiment of the front 501 and rear 502 of a data storage drive 15. In the example, the data storage drive 15 comprises a hot-swap drive canister. This is only an example and is not meant to limit the invention to hot-swap drive canisters. In fact, any configuration of a data storage drive may be used whether or not it comprises a hot-swap canister. A data storage cartridge may be placed into the data storage drive 15 at opening 503. As discussed above, a data storage drive 15 is used to read and/or write data with respect to the data storage media of a data storage cartridge, and may additionally communicate with a memory which is separate from the media and is located within the cartridge.

Figure 6:
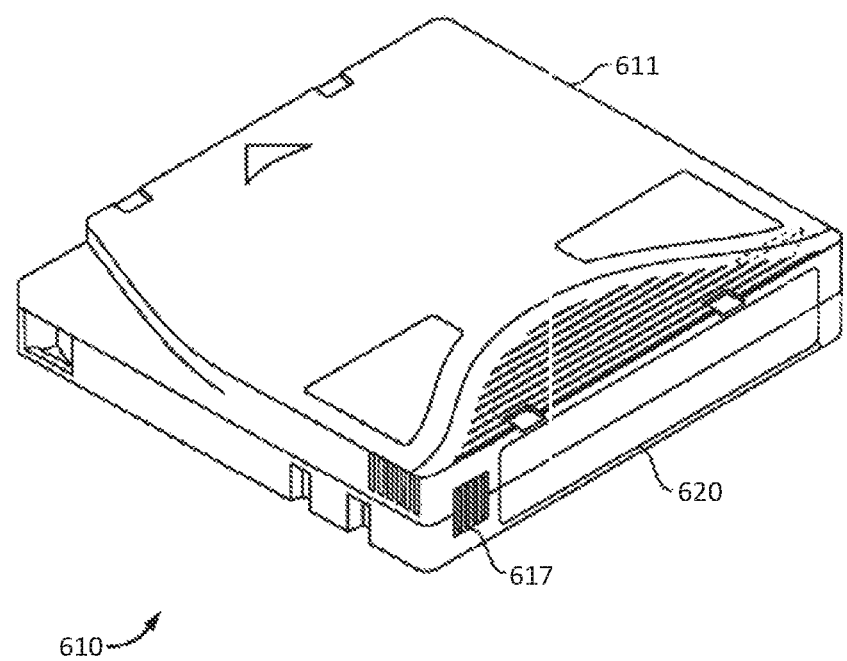
FIG. 6 is an isometric view of an example of an element, such as a cartridge, which may be placed in a storage slot of the automated data storage library of FIGS. 1, 2 and 3, in accordance with an embodiment of the present invention.

FIG. 6 illustrates an embodiment of a data storage cartridge 610 with cartridge shell 611, front label area 620, and write protect switch 617. It should be noted that the data storage cartridge 610 may include cartridge media and/or memory. However, the data storage cartridge 610 may be used whether or not it comprises a cartridge memory. Media of the data storage cartridge media may comprise any type of media on which data may be stored, including but not limited to magnetic media (such as magnetic tape or disks), optical media (such as optical tape or disks), electronic media, or other suitable media.

With the foregoing functional components, the mechanisms of the illustrated embodiments optimize the performance in an automated data storage library by predetermining optimal demount position for demounting data storage cartridges in an automated data storage library. Each time an accessor performs any type of movements across any number of storage frames, whether the accessor movement is for an import operation, export operation, a mount operation, a demount operation, a prestage operation, and/or a destage operation, a selected demount position may be predetermined for demounting data storage cartridges in the automated data storage library for each mounted data storage cartridge (e.g., tape cartridges) during one of a plurality of robotic movements by an accessor. In one aspect, an import operation may be defined as bringing new data storage cartridges from the outside into the library. An export operation may be defined as removing cartridges from the library. The mount operation may be defined as moving data storage cartridges to a drive. The demount may be defined as removing the data storage cartridge from the tape drive. The prestage may be defined as moving a data storage cartridge to a faster accessing tier in the library. The destage may be defined as moving a data storage cartridge to a slower accessing tier in the library.

As part of the operations of calculating and/or determining a best possible or "optimal" destination slot, one or more of the following operations may be performed.

In another embodiment, the calculating and/or determining comprises determining that the optimal destination slots may be a least recently used storage slot, a frontmost tier of a multi-cartridge deep slot cell, a rearmost tier of a multi-cartridge deep slot cell, most recently used storage slot, a closest storage slot to a mounted storage cartridge that is to be demounted, a vacated storage slot, or a combination thereof.

In one aspect, the accessor(s) may determine whether a frontmost tier of at least selected multi-cartridge deep slot cells is full; and in response to the determining step indicating that the frontmost tier of at least selected multi-cartridge deep slot cells is full, determining, as the optimal demount position, one of the selected multi-cartridge deep slot cells having a factored greatest number of tiers, ranging from a frontmost tier to a rearmost tier, available to place a data storage cartridge. That is, the best possible or "optimal" destination slot may be the destination slot that fills at least the frontmost tier (tier 1), and/or an optimal destination slot that fills additional tiers of certain cells based on additional factors such as the proximity to a data storage drive. A sliding scale may be used where the term "greatest number of vacant tiers" is factored by, for example, proximity to a drive. Thus, a multi-cartridge deep slot cell with N−1, etc., vacant tiers that is close to a data storage drive is considered the same as a multi-cartridge deep slot cell with N vacant tiers that is more distant from a data storage drive. Herein, both a direct, non-sliding scale selection requiring the actual "greatest" number of vacant tiers, and a sliding scale selection equating various numbers of vacant tiers are termed "factored greatest number of vacant tiers".

In another embodiment, the calculating and/or determining comprises determining whether the frontmost tier of at least selected multi-cartridge deep slot cells is full; and in response to the determining step indicating that the frontmost tier of at least selected multi-cartridge deep slot cells is full, determining whether any multi-cartridge deep slot cells have vacant tiers available to place a data storage cartridge, and, determining the optimal destination slot(s) for each mounted cartridge as the destination slots that fill each tier of the multi-cartridge deep slot cartridges having vacant tiers available in turn on a random selection basis until the available tiers of the selected multi-cartridge deep slot cells are full.

In still another embodiment, the calculating and/or determining comprises determining whether the frontmost tier of at least selected multi-cartridge deep slot cells is full; and in response to the determining step indicating that the frontmost tier of at least selected multi-cartridge deep slot cells is full, determining whether any multi-cartridge deep slot cells have vacant tiers available to place a data storage cartridge, and, if so, determining that the optimal destination slot is a selected multi-cartridge deep slot cell having at least one available vacant tier and having the least recently used data storage cartridge in the frontmost tier of the multi-cartridge deep slot cell.

In another embodiment, the calculating and/or determining comprises determining whether the frontmost tier of at least selected multi-cartridge deep slot cells is full; and in response to the determining step indicating that the frontmost tier of at least selected multi-cartridge deep slot cells is full, determining whether any multi-cartridge deep slot cells have vacant tiers available to place a data storage cartridge, and, if so, determining that the optimal destination slot is a selected multi-cartridge deep slot cell having at least one available vacant tier and having the closest proximity to the source of the move of the data storage cartridge being placed.

In one aspect, the accessor(s) may determine that the optimal destination slot is the destination slot that fills, at least the frontmost tier of vacant at least selected multi-cartridge deep slot cells, while leaving other tiers vacant.

In a further embodiment, the operation additionally comprises determining whether the frontmost tier of at least selected multi-cartridge deep slot cells is full; and in response to the determining step indicating that the frontmost tier of at least selected multi-cartridge deep slot cells is full, determining that the optimal destination slot is that destination slot that may be placed into the one of the selected multi-cartridge deep slot cells having the factored greatest number of tiers available to place a data storage cartridge.

In another embodiment, the operation additionally comprises determining whether the frontmost tier of at least selected multi-cartridge deep slot cells is full; and in response to the determining step indicating that the frontmost tier of at least selected multi-cartridge deep slot cells is full, determining whether any multi-cartridge deep slot cells have vacant tiers available to place a data storage cartridge, and, if so, determining that the optimal destination slots are multi-cartridge deep slot cells located in at least one of each tier of the multi-cartridge deep slot cartridges having vacant tiers available in turn on a random selection basis until the available tiers of the selected multi-cartridge deep slot cells are full.

In still another embodiment, the operation additionally comprises determining whether the frontmost tier of at least selected multi-cartridge deep slot cells is full; and in response to the determining step indicating that the frontmost tier of at least selected multi-cartridge deep slot cells is full, determining whether any multi-cartridge deep slot cells have vacant tiers available to place a data storage cartridge, and, if so, determining that the optimal destination slot is that destination slot that may be placed in a selected multi-cartridge deep slot cell having at least one available vacant tier and having the least recently used data storage cartridge in the frontmost tier of the multi-cartridge deep slot cell.

In another embodiment, the operation additionally comprises determining whether the frontmost tier of at least selected multi-cartridge deep slot cells is full; and in response to the determining step indicating that the frontmost tier of at least selected multi-cartridge deep slot cells is full, determining whether any multi-cartridge deep slot cells have vacant tiers available to place a data storage cartridge, and, if so, determining that the optimal destination slot is that destination slot that may be placed in a selected multi-cartridge deep slot cell having at least one available vacant tier and having the closest proximity to the source of a move of the data storage cartridge being placed.

In another embodiment, the calculating and/or determining comprises for operating the accessor(s) to selectively extract, place and transport data storage cartridges with respect to the multi-cartridge deep slot cells and with respect to other elements of the automated data storage library and positioning data storage cartridges in the sequential order with respect to the multi-cartridge deep slot cells; determining whether all tiers of at least selected the multi-cartridge deep slot cells except the rearmost tier are full; and, in response to the determining step indicating that all tiers of at least selected the multi-cartridge deep slot cells except the rearmost tier are full, determining that the optimal destination slots are destination slots for mounted data storage cartridges that may be placed in the rearmost tier of the multi-cartridge deep slot cells except for an evenly spread selection of the multi-cartridge deep slot cells. The evenly spread selection comprises filling the rearmost tier based on a random selection or filling the rearmost tier of the selected multi-cartridge deep slot cells except for every Nth one of the multi-cartridge deep slot cells.

In another embodiment, the calculating and/or determining comprises determining that the optimal destination slot is a multi-cartridge deep slot cell having at least one vacant tier therein and having the closest proximity to a source of the move.

In another embodiment, the calculating and/or determining comprises determining that the optimal destination slot is filling the rearmost tier of selected multi-cartridge deep slot cells, additionally determining whether a threshold level of the cells are full, including the rearmost tier, and, if so, determining that the optimal destination slot is an alternative multi-cartridge deep slot cell(s) other than the selected cells.

In another embodiment, the calculating and/or determining comprises, determining that the optimal destination slot is a destination storage that where, if a data storage cartridge is recently used by a selected other element of the automated data storage library, and is to be demounted from the selected other element: first, the another data storage cartridge may be extracted from the storage slots, vacating one of the storage slots; and second, the optimal destination slot is placing the demounted data storage cartridge in the vacated storage slot. In a further embodiment, the method comprises, in the first extracting another data storage cartridge step, extracting the least recently used data storage cartridge stored in the storage slots. In another embodiment, the method comprises, in the first extracting another data storage cartridge step, extracting the data storage cartridge from a storage slot having the closest proximity to the source of the move of the demounted data storage cartridge. In still another embodiment, wherein the data storage library comprises at least two of the accessors configured to selectively extract, place and transport data storage cartridges with respect to the multi-cartridge deep slot cells and the storage slots, the method comprises operating one of the accessors to perform the first step and operating another of the accessors to perform the second step. In another embodiment, the another data storage cartridge comprises a least recently used data storage cartridge stored in the storage slots. In still another embodiment, the another data storage cartridge comprises a data storage cartridge having a null usage timestamp.

By way of example only, consider a mount operation moving from storage frame 3 to storage frame 6 in an automated data storage library. As the mount operation is performed multiple threads may be spawned to perform a recalculation for each mounted drive to determine the best next demount position for said drives. Then, if a demount operation is to be performed afterwards for that tape drive in frame 6, the inventory table may be used to look up the pre-calculated or pre-determined optimal storage position. A determination operation may be performed to check to see if this pre-determined optimal storage position is still available. If the pre-determined storage position is still available, the tape cartridge may be moved to the location (e.g., the pre-determined storage position). If the position was occupied by another tape cartridge, which may be due to outside forces, an alternative storage position (e.g., a next best optimal position) may be calculated or determined before the demount operation occurs and may repeat the same operations, as described, when the demount operation move begins by performing the recalculation or re-determination on each mounted drive to determine the new, pre-determined storage position (e.g., a new optimal demount position) during the move.

Consider now some of the various aspects of the illustrated embodiments. (1) Mount Operation. The mechanisms of the present invention may receive or obtain an operation (e.g., a request to perform an operation). A determination operation may be performed to determine if the operation is a mount operation. If the operation is a mount operation, a verification operation may be performed to verify if a destination tape drive is empty and the source storage slot is occupied. If the destination tape drive (e.g., destination storage slot) is empty and available, the mount operation may commence and the pre-determined storage position may be determined or calculated for each mounted data storage cartridge. The status of the destination tape drive may be updated as occupied ("full") and the source storage slot may be updated as unoccupied ("empty"). The mount operation may complete the robotic movements of the accessor.

(2) Demount Operation. The mechanisms of the present invention may receive or obtain an operation. A determination operation is performed to determine if the operation is a demount operation. If the operation is a demount operation, a verification operation may be performed to verify if an inventory table is empty (e.g., contains no pre-determined storage position) and the source tape drive is occupied.

(A) If the inventory look up table is not empty (e.g., contains the pre-determined storage positions), the inventory table may be used to look up whether the pre-determined storage position is still available or is now occupied/unavailable.

(i) If the pre-determined storage position is available, a verification operation may be performed to verify if a destination storage slot (e.g., the pre-determined storage position) is empty and the source tape drive is occupied. The demount operation may commence and a pre-determined storage position may be determined or calculated for each mounted data storage cartridge. The status of the destination storage slot may be updated as occupied ("full") and the source tape drive may be updated as unoccupied ("empty"). The demount operation may complete the robotic movements.

(ii) Alternatively, if the pre-determined storage position is occupied and unavailable, the pre-determined storage position may be determined or calculated for the data storage cartridge intending to be demounted (e.g., the demounting tape drive). A verification operation may be performed to verify if a destination storage slot (e.g., the pre-determined storage position) is empty and the source tape drive is occupied. The demount operation may commence. Pre-determined storage positions may be determined or calculated for each mounted data storage cartridges. The status of the destination storage slot may be updated as occupied ("full") and the source tape drive may be updated as unoccupied ("empty"). The mount operation may complete the robotic movements.

(B) If the inventory look up table is empty (e.g., does not contain a pre-determined storage position), the optimal storage position may be determined or calculated for the data storage cartridge intending to be demounted (e.g., the demounting tape drive). A verification operation may be performed to verify if a destination storage slot (e.g., the pre-determined storage position) is empty and the source tape drive is occupied. The demount operation may commence. Pre-determined storage positions may be determined or calculated for each mounted data storage cartridge. The status of the destination storage slot may be updated as occupied ("full") and the source tape drive may be updated as unoccupied ("empty"). The mount operation may then complete the robotic movements.

(3) Import/Export Operation. The mechanisms of the present invention may receive or obtain an operation. A determination operation is performed to determine if the operation is an import and/or export operation. If the operation is either an import operation or an export operation, a verification operation may be performed to verify if a destination tape storage slot (e.g., the pre-determined storage position) is empty and the source tape storage slot is occupied. The import operation or an export operation may commence. Pre-determined storage positions may be determined or calculated for each mounted data storage cartridge. The status of the destination tape storage slot may be updated as occupied ("full") and the source storage slot may be updated as unoccupied ("empty"). The import/export operation may complete the robotic movements.

Figure 7:
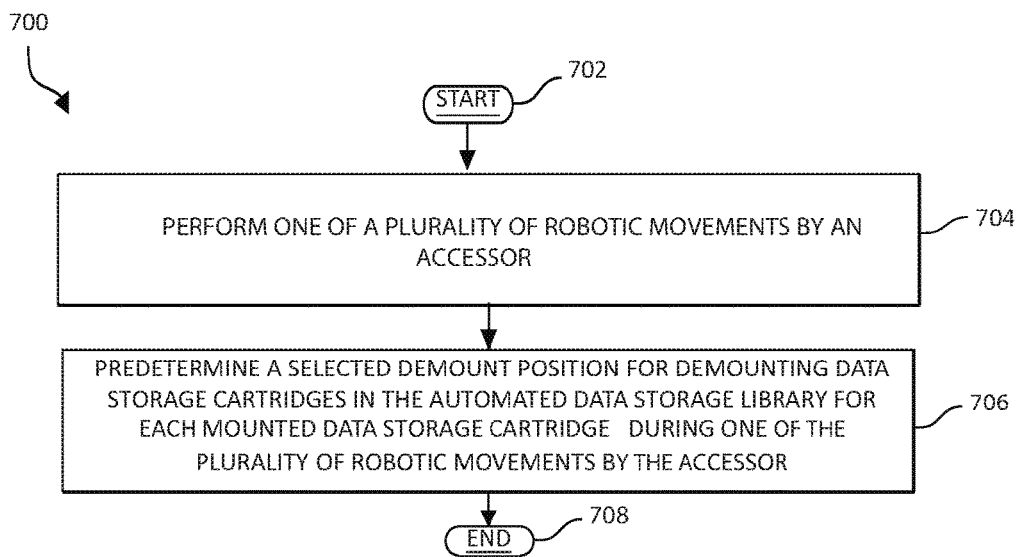
FIG. 7 a flowchart diagram depicting an exemplary method for predetermining optimal demount positions for demounting data storage cartridges in an automated data storage library by a processor; again in which aspects of the present invention may be realized.

Turning now to FIG. 7, a method 700 for predetermining selected demount position for demounting data storage cartridges in an automated data storage library is depicted, in which various aspects of the illustrated embodiments may be implemented. The functionality 700 may be implemented as a method executed as instructions on a machine, where the instructions are included on at least one computer readable medium or on a non-transitory machine-readable storage medium. The functionality may start in block 702. One of a plurality of robotic movements by an accessor may be performed, as in block 704. The robotic movements may be, for example, a mount operation, a demount operation, a prestage operation, a destage operation, an export operation, and/or an import operation. A selected demount position may be predetermined for demounting data storage cartridges in the automated data storage library for each mounted data storage cartridge during one of the plurality of robotic movements by an accessor, as in block 706. The functionality 700 may end at block 708.

In one aspect, in conjunction with and/or as part of at least one block of FIG. 7, the operation of 700 may include each of the following. The operation of 700 may include using a table of predetermined selected demount positions of data storage slots for the predetermining. A determination operation may be performed to determine if the selected demount position is available or occupied. An indication may be provided that the one or more tape drives are available or occupied.

The operation of 700 may include predetermining the selected demount position during a mount operation, a demount operation, a prestage operation, a destage operation, an export operation, and/or an import operation, performed by the accessor across N number (e.g., any number) of storage frames, of a data storage cartridge to the one or more tape drives, wherein N may be a predetermined number or positive integer.

Figure 8:
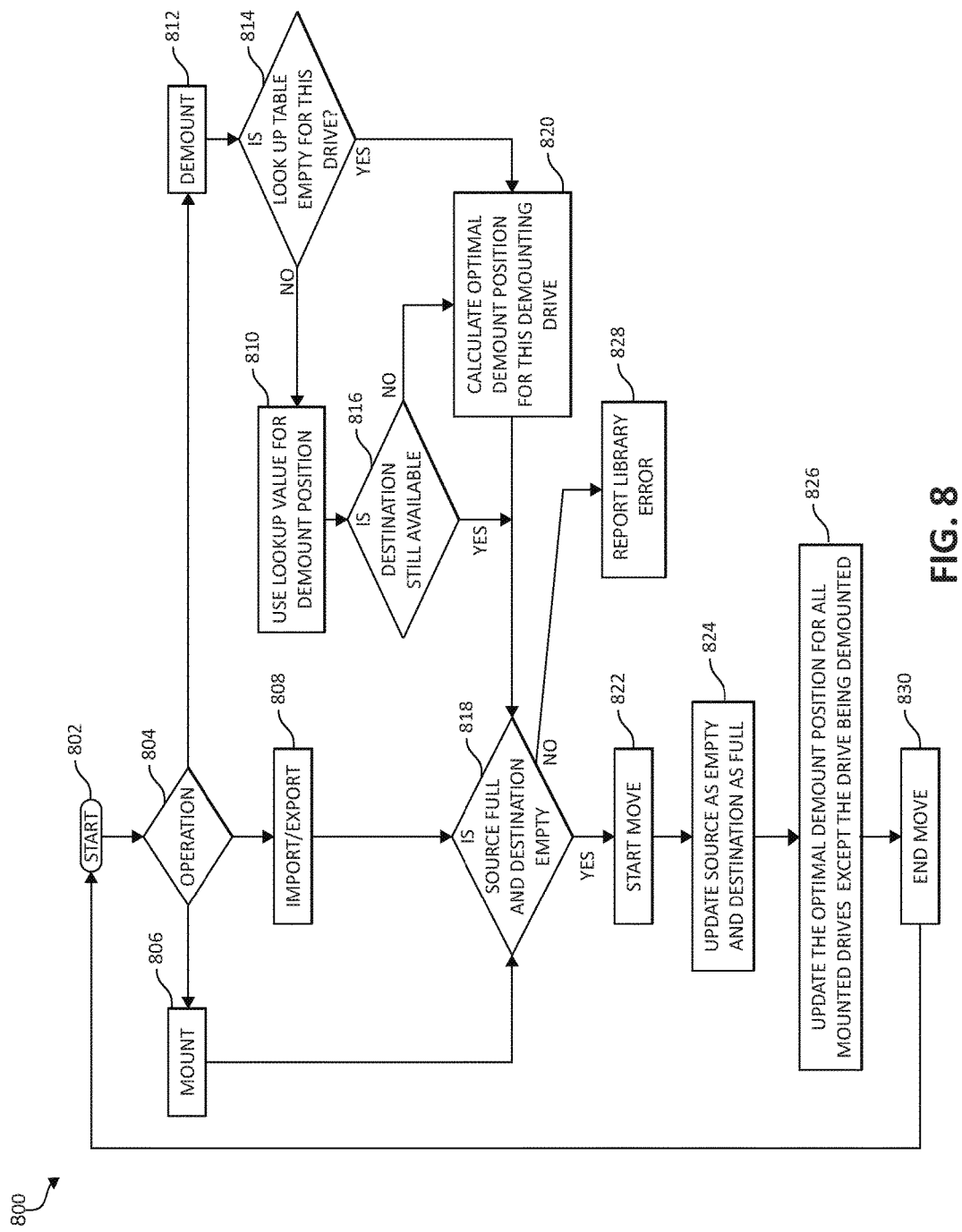
FIG. 8 is an additional flowchart diagram depicting an additional exemplary method for predetermining optimal demount positions for demounting data storage cartridges in an automated data storage library by a processor; again in which aspects of the present invention may be realized.

Consider now an additional embodiment depicted in FIG. 8, which illustrates an additional method for predetermining optimal demount position for demounting data storage cartridges in an automated data storage library. The functionality 800 may be implemented as a method executed as instructions on a machine, where the instructions are included on at least one computer readable medium or on a non-transitory machine-readable storage medium. The functionality may start in block 802. In block 804, an operation may be received and a determination operation is performed to determine whether the operation is a mount operation, a demount operation, and/or an import/export operation. If the operation is determined to be a mount operation, the functionality may move to block 806 to start the mount operation. The functionality 800 can move from block 806 to block 818.

If the operation is determined to be a demount operation, the functionality may move to block 812 to start the demount operation. A determination is made as to whether a look up table (e.g., a table of predetermined selected demount positions of data storage slots) is empty (e.g., no calculated or determined positions) for the tape drive, as in block 814. If yes from block 814, the functionality 800 can move to block

820 to calculate or determine a selected demount position (e.g., an optimal demount position) for demounting the data storage cartridge. If no from block 814, the look up table may be used to determine a lookup value for the demount position in the automated data storage library, as in block 810. From block 810, the functionality 800 may move to block 816, which determines if the destination demount position is available (e.g., unoccupied). If no from block 816, the functionality moves to block 820. If yes from block 816, the functionality moves to block 818.

Returning now to block 804, if the operation is determined to be an import and/or export operation, the functionality may move to block 808 to start the import and/or export operation. From either blocks 806, 808, 816, and 820, a determination operation may be performed to determine if the predetermined selected demount position (e.g., source location or "source") is empty and available, as in block 818. If no at block 818, an error operation may be issued or reported, as in block 828. If yes at block 818, the accessor may commence the movement operation (e.g., the mount operation, the demount operation, the import/export operation), as in block 822. The predetermined selected demount position (e.g., source location) is updated as empty and the predetermined selected demount position (e.g., destination location) as full, as in block 824. The predetermined selected demount positions for all mounted data storage cartridges/tape drives may be updated (e.g., recalculated and/or re-determined) with the exception of the data storage cartridge/tape drive being demounted, as in block 826. The functionality 800 may end, as in block 830.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM, EEPROM or Flash memory), a static random access memory (SRAM), dynamic random access memory (DRAM), a portable compact disc read-only memory (CD-ROM), a digital versatile disk (DVD), a memory stick, a floppy disk, a CompactFlash (CF) card, a Secure Digital (SD) card, a miniSD card, a microSD card, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In one aspect, a computer may include a library controller. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to one or more processors of a general purpose computer, special purpose computer, or other programmable data processing apparatus to produce a machine, such that the instructions, which execute via the one or more processors of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions. In addition, some blocks may be omitted without deviating from the scope of the invention.

The invention claimed is:

1. A method, by one or more processors, for predetermining optimal demount placement in an automated data storage library, comprising:
predetermining, while performing one of a plurality of robotic movements by an accessor, a selected demount position for each mounted data storage cartridge for demounting data storage cartridges in the automated data storage library such that each predetermined selected demount position is stored in a lookup table of predetermined selected demount positions for a subsequent demount operation, wherein idle time of the accessor during a demount operation is reduced; and
recalculating the selected demount position for each mounted data storage cartridge for demounting the data storage cartridges while performing the subsequent demount operation; wherein the selected demount position is determined according to the recalculation prior to a demount command being issued.

2. The method of claim 1, further including using one of the predetermining selected demount positions stored in the lookup table of predetermined selected demount positions for the subsequent demount operation for a data storage cartridge.

3. The method of claim 1, further including:
determining if the selected demount position is available or occupied; or
providing an indication that one or more tape drives or storage slots are available or occupied.

4. The method of claim 1, further including predetermining the selected demount position during a mount operation or demount operation, performed by the accessor across any number of storage frames, of a data storage cartridge to or from one or more tape drives or storage slots.

5. The method of claim 1, further including predetermining the selected demount position during a prestage operation or a destage operation, performed by the accessor across any number of storage frames, of a data storage cartridge to one or more tape drives or storage slots.

6. The method of claim 1, further including predetermining the selected demount position during an export operation or an import operation, performed by the accessor across any number of storage frames, of a data storage cartridge to the one or more tape drives or storage slots.

7. A system for predetermining optimal demount placement in an automated data storage library, comprising:
one or more processors with executable instructions that when executed cause the system to:
predetermine, while performing one of a plurality of robotic movements by an accessor, a selected demount position for each mounted data storage cartridge for demounting data storage cartridges in the automated data storage library such that each predetermined selected demount position is stored in a lookup table of predetermined selected demount positions for a subsequent demount operation, wherein idle time of the accessor during a demount operation is reduced; and
recalculate the selected demount position for each mounted data storage cartridge for demounting data storage cartridges while performing the subsequent demount operation; wherein the selected demount position is determined according to the recalculation prior to a demount command being issued.

8. The system of claim 7, wherein the executable instructions further use the predetermining selected demount position stored in the lookup table of predetermined selected demount positions for the subsequent demount operation.

9. The system of claim 7, wherein the executable instructions further:
determine if the selected demount position is available or occupied; or
provide an indication that one or more tape drives or storage slots are available or occupied.

10. The system of claim 7, wherein the executable instructions further predetermine the selected demount position during a mount operation or demount operation, performed by the accessor across any number of storage frames, of a data storage cartridge to one or more tape drives or storage slots.

11. The system of claim 7, wherein the executable instructions further predetermine the selected demount position during a prestage operation or a destage operation, performed by the accessor across any number of storage frames, of a data storage cartridge to one or more tape drives or storage slots.

12. The system of claim 7, wherein the executable instructions further predetermine the selected demount position during an export operation or an import operation, performed by the accessor across any number of storage frames, of a data storage cartridge to one or more tape drives or storage slots.

13. A computer program product for, by one or more processors, predetermining optimal demount placement in an automated data storage library, the computer program product comprising a non-transitory computer-readable storage medium having computer-readable program code portions stored therein, the computer-readable program code portions comprising:
an executable portion that predetermines, while performing one of a plurality of robotic movements by an accessor, a selected demount position for each mounted data storage cartridge for demounting data storage cartridges in the automated data storage library such that each predetermined selected demount position is stored in a lookup table of predetermined selected demount positions for a subsequent demount operation, wherein idle time of the accessor during a demount operation is reduced; and an executable portion that recalculates the selected demount position for each mounted data storage cartridge for demounting data storage cartridges while performing the subsequent demount operation; wherein the selected demount position is determined according to the recalculation prior to a demount command being issued.

14. The computer program product of claim 13, further including an executable portion that uses a table of predetermined selected demount positions of storage slots for the predetermining.

15. The computer program product of claim 13, further including an executable portion that:
  determines if the selected demount position is available or occupied; and
  provides an indication that the one or more tape drives or storage slots are available or occupied.

16. The computer program product of claim 13, further including an executable portion that predetermines the selected demount position during a mount operation or demount operation, performed by the accessor across any number of storage frames, of a data storage cartridge to the one or more tape drives or storage slots.

17. The computer program product of claim 13, further including an executable portion that predetermines the selected demount position during a prestage operation or a destage operation, performed by the accessor across any number of storage frames, of a data storage cartridge to the one or more tape drives or storage slots.

18. The computer program product of claim 13, further including an executable portion that predetermines the selected demount position during an export operation or an import operation, performed by the accessor across any number of storage frames, of a data storage cartridge to the one or more tape drives or storage slots.

* * * * *